United States Patent
Dalluge

(10) Patent No.: US 8,061,681 B2
(45) Date of Patent: Nov. 22, 2011

(54) APPARATUS AND METHODS TO COUPLE ACTUATOR STEMS AND ROD END BEARINGS

(75) Inventor: Paul Russell Dalluge, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 776 days.

(21) Appl. No.: 12/115,280

(22) Filed: May 5, 2008

(65) Prior Publication Data

US 2009/0272927 A1 Nov. 5, 2009

(51) Int. Cl.
*F16K 31/00* (2006.01)
(52) U.S. Cl. .................. 251/61.4; 251/61; 251/331
(58) Field of Classification Search ........... 251/61, 251/61.2, 61.4, 331, 335.2
See application file for complete search history.

(56) References Cited

U.S. PATENT DOCUMENTS

| | | | | |
|---|---|---|---|---|
| 1,585,479 A | * | 5/1926 | Fisher | 251/61.4 |
| 3,602,478 A | * | 8/1971 | Cairns | 251/58 |
| 3,727,837 A | | 4/1973 | Gazzera et al. | |
| 3,913,883 A | * | 10/1975 | Irwin | 251/25 |
| 3,985,151 A | * | 10/1976 | Smith | 137/269 |
| 5,346,172 A | * | 9/1994 | Gonsior | 251/58 |
| 6,015,134 A | | 1/2000 | Johnson | |
| 6,250,605 B1 | * | 6/2001 | Young | 251/291 |
| 6,886,805 B2 | * | 5/2005 | McCarty | 251/214 |
| 2005/0017209 A1 | | 1/2005 | Young | |
| 2007/0267587 A1 | | 11/2007 | Dalluge | |

OTHER PUBLICATIONS

International Searching Authority, "International Search Report," issued in connection with international application No. PCT/US2009/040303, mailed Jul. 1, 2009, 4 pages.
International Searching Authority, "Written Opinion of the International Searching Authority," issued in connection with international application No. PCT/US2009/040303, mailed Jul. 1, 2009, 7 pages.
Fisher Controls International, LLC., "Type 1051 and 1052 Diaphragm Rotary Actuators", Fisher Product Bulletin, issued May 2007, 12 pages.

* cited by examiner

*Primary Examiner* — John Fristoe, Jr.
(74) *Attorney, Agent, or Firm* — Hanley, Flight & Zimmerman, LLC

(57) ABSTRACT

Methods and apparatus to couple actuator stems and rod end bearings are described. An example apparatus includes a bearing having a body and a portion extending from the body in which the portion includes an internally threaded bore. An actuator stem has a first end that includes an internally threaded bore. An externally threaded stud threadably engages the bores of the rod end bearing and the actuator stem to couple the rod end bearing and the actuator stem.

19 Claims, 3 Drawing Sheets

APPARATUS AND METHODS TO COUPLE ACTUATOR STEMS AND ROD END BEARINGS

FIELD OF THE DISCLOSURE

This disclosure relates generally to control valves and, more particularly, to apparatus and methods to couple actuator stems and rod end bearings.

BACKGROUND

Automated control valves such as, for example, rotary control valves, are often used in process control plants or systems to control the flow of process fluids. A rotary control valve typically includes an actuator (e.g., a pneumatic actuator, an electric actuator, a hydraulic actuator, etc.) operatively coupled to a shaft extending from a rotary valve via a lever. The lever converts a rectilinear displacement of an actuator stem into a rotational displacement of the valve shaft. Thus, rotation of the lever causes the valve shaft and a flow control member (e.g., a disk, a ball, etc.) coupled to the valve shaft to rotate to increase or restrict the flow of fluid through the valve.

To couple the lever to the actuator stem, a rod end bearing is typically employed. The rod end bearing may include an internally threaded bore (i.e., a female connection) that threadably receives an externally threaded end (i.e., a male connection) of the actuator stem. Alternatively, the rod end bearing may include an externally threaded end that threadably couples to an internally threaded bore of the actuator stem. In either case, the externally threaded portion of the rod end bearing and/or the actuator stem is typically formed by machining bar stock. However, for typical bar stock, the cold-worked, high strength material is concentrated near the outer portion of the bar stock, which is usually machined away during formation of the externally threaded end (e.g., the externally threaded end of the rod end bearing or, alternatively, the externally threaded end of the actuator stem). As a result, the externally threaded end is typically formed from the softer, weaker material near the core of the bar stock.

SUMMARY

In one example, a control valve includes an actuator disposed within a housing having a diaphragm captured between a first actuator casing and a second actuator casing. An actuator stem has a first end and a second end that each include an internally threaded bore, in which the first end of the actuator stem operatively couples to the diaphragm. The control valve further includes a rod end bearing having a bearing retainer and a shaft portion extending from the bearing retainer in which the shaft portion includes an internally threaded bore. An externally threaded stud threadably engages the bore of the shaft portion and the bore of the second end of the actuator stem to couple the rod end bearing and the actuator stem.

In another example, an assembly for use with a control valve includes a bearing having a body and a portion extending from the body, in which the portion includes an internally threaded bore, and an actuator stem having a first end that includes an internally threaded bore. An externally threaded stud threadably engages the bores of the rod end bearing and the actuator stem to couple the rod end bearing and the actuator stem.

In yet another example, a method to couple a rod end bearing and an actuator stem includes obtaining a rod end bearing having a portion with an internally threaded bore and an actuator stem having an internally threaded bore at a first end and coupling the rod end bearing to the actuator stem via an externally threaded stud.

DETAILED DESCRIPTION

In general, the example methods and apparatus described herein provide increased strength to a connection between a rod end bearing and an actuator stem of a control valve. In particular, the example method and apparatus include an externally threaded stud that couples a rod end bearing to an actuator stem. Each of the rod end bearing and the actuator stem includes an end having an internally threaded bore to receive the externally threaded stud.

The example methods and apparatus described herein advantageously replace coupling mechanisms that use an externally threaded rod end bearing end or, alternatively, an externally threaded end of an actuator stem, which, as noted above, are typically formed by machining away the higher strength material concentrated near the outer surface of a bar stock. As a result, the example rod end bearing and actuator stem connection described herein provides greater strength to resist loads (e.g., torsional loads) transmitted to the rod end bearing and actuator stem connection during assembly and/or disassembly of the control valve. For example, the rod end bearing and actuator stem connection described herein substantially reduces twist off or fracture due to inadvertent over torquing or tightening of a fastener when coupling a diaphragm plate to and/or removing a diaphragm plate from the end of the actuator stem opposite the end coupled to the rod end bearing.

Figure 1:
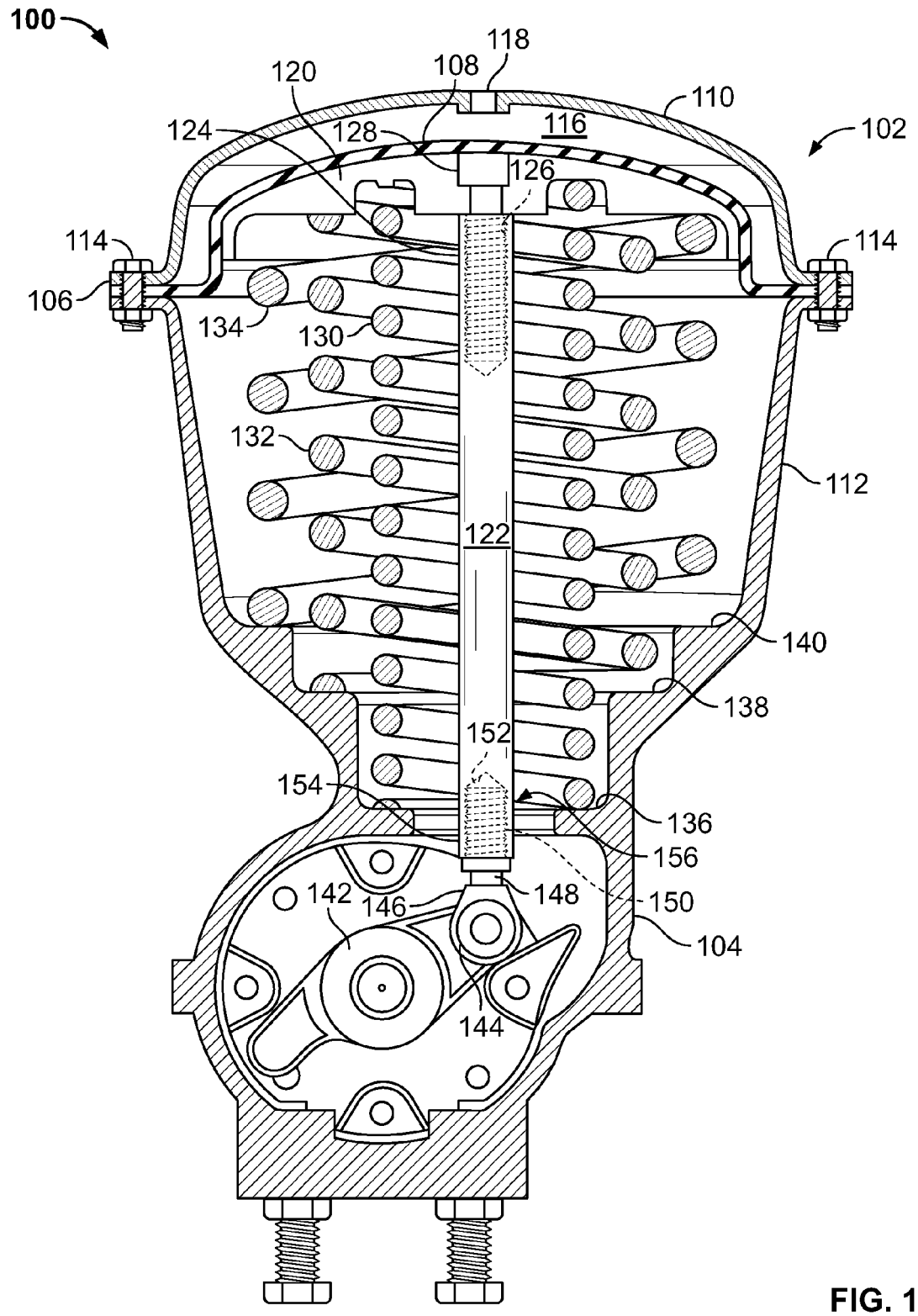
FIG. 1 illustrates a known example rotary control valve having an externally threaded rod end bearing coupled to an internally threaded bore of an actuator stem.

FIG. 1 is a cross-sectional view of a known rotary control valve assembly 100. Referring in detail to FIG. 1, the example rotary control valve assembly 100 includes an actuator 102 coupled to a housing 104 of the rotary control valve 100. The actuator 102 includes a casing 106 that captures a diaphragm 108 between an upper casing portion 110 and a lower casing portion 112. The casing portions 110 and 112 are coupled together with a plurality of threaded fasteners 114 spaced along an outer edge of the casing 106. The diaphragm 108 separates the space within the casing 106 into a control pressure chamber 116 through which a controlled pressure is supplied via an inlet port 118 to displace the diaphragm 108. A diaphragm plate 120 couples the diaphragm 108 to an actuator stem or diaphragm rod 122 and provides a rigid backing for the diaphragm 108. The actuator stem 122 includes a first end 124 having an internally threaded bore 126 that receives a fastener 128 (e.g., a cap screw) to couple the diaphragm plate 120 to the actuator stem 122.

Springs 130, 132, and 134 surround the actuator stem 122 and are disposed between the diaphragm plate 120 and respective spring seats 136, 138, and 140 formed as shoulders on the lower casing 112. Each of the springs 130, 132, and 134 provides a biasing force against the diaphragm plate 120 to return the actuator stem 122 and any suitable operator (e.g., a flow control member of a rotary valve) coupled to the actuator stem 122 to a known position in the absence of a control pressure applied to the diaphragm 108. The actuator stem 122 rotatably couples to a lever 142 via a rod end bearing 144.

The rod end bearing 144 includes a bearing retainer or body 146 having a shaft or shank 148 extending therefrom. The retainer body 146 rotatably couples to the lever 142 and the shaft 148 couples to the actuator stem 122. At least a portion of the shaft 148 includes external threads 150 that threadably couple to an internally threaded bore 152 at a second end 154 of the actuator stem 122. However, in other examples, the shaft 148 of the rod end bearing 144 may include an internally threaded bore that receives an externally threaded portion of the actuator stem 122.

As described above, the external threads 150 of the rod end bearing 144 are typically formed by machining bar stock with a sufficient diameter to form a connection 156 between the rod end bearing 144 and the actuator stem 122. However, a typical bar stock provides high strength material concentrated near an outer portion of the bar stock, which is machined away during formation of the external threads 150.

During assembly of the control valve 100, the rod end bearing 144 is coupled to the actuator stem 122 and disposed within the housing 104. The springs 130, 132, and 134 are then disposed in the actuator casing 106 to surround the actuator stem 122. The diaphragm plate 120 is then coupled to the actuator stem 122 via the fastener 128. As the fastener 128 is tightened, the diaphragm plate 120 compresses the springs 130, 132, and 134, which provides a preload condition.

The torque applied to tighten the fastener 128 causes the actuator stem 122 to angularly deflect, thereby transmitting a torsional load to the rod end bearing and actuator stem connection 156. However, due to the manner in which machined external threads 150 are formed, the amount of torque that can be applied to the fastener 128 to tighten and/or loosen the fastener 128 is limited. Specifically, if too much torque is applied to the fastener 128 during assembly due to operator error, the greater torsional load imparted to the connection 156 may cause twist off or fracture of the smaller diameter, externally threaded end 148 of the rod end bearing 144, thereby causing the connection 156 to fail. Further, a failure of the rod end bearing and the actuator stem connection 156 may cause the springs 130, 132, and 134 to eject while under compressive load.

Additionally, in some instances during disassembly of the control valve 100 for maintenance, replacement of components, and/or any other purpose, a greater amount of torque may be required to loosen the fastener 128 than that was applied to tighten the fastener 128. This may result from, for example, corrosion of the valve components (e.g., the fastener 128), and/or other factors. As a result, the greater amount of torque required to loosen the fastener 128 may cause the externally threaded end 148 to twist off or fracture, thereby causing the connection 156 to fail. To resist the angular deflection, the actuator stem 122 may include flats or hex shaped protrusions (not shown) that are engaged using a tool such as, for example, a hex wrench. However, flats are not easily accessible when the actuator stem 122 is disposed within the housing 104. Furthermore, merely increasing the diameter of the actuator stem 122 and/or the shaft 148 of the rod end bearing 144 to machine the external threads 150 may not be practical because of the space constraints within the actuator casing 106 and/or increase in manufacturing costs.

Although the control valve 100 of FIG. 1A illustrates a pneumatic actuator 102, the example control valve 100 may use any other type of actuator such as, for example, an electric actuator, a hydraulic actuator, etc.

Figure 2:
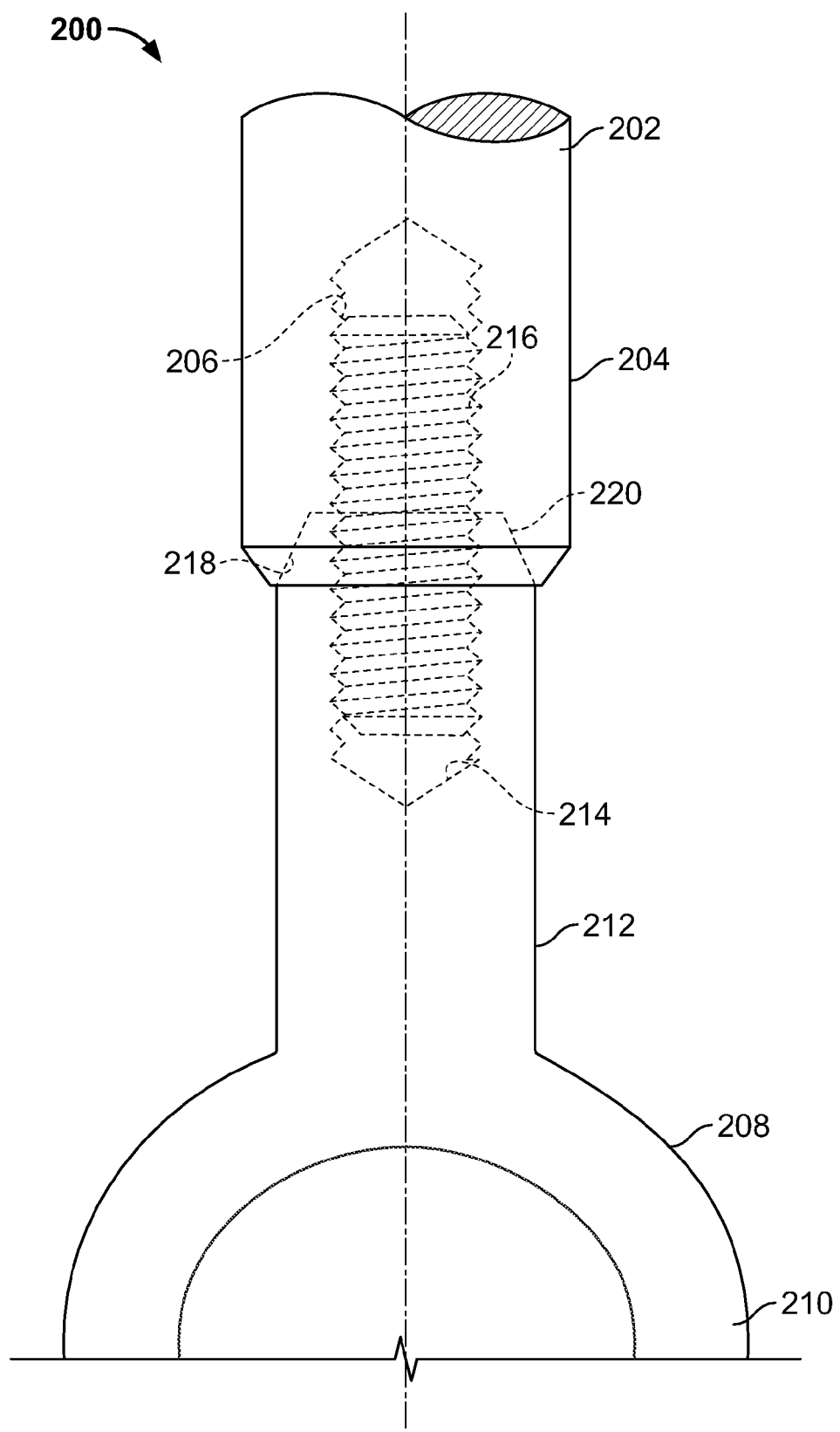
FIG. 2 illustrates an example rod end bearing and actuator stem connection described herein.

FIG. 2 illustrates an example rod end bearing and actuator stem connection 200 described herein. In the illustrated example, an actuator stem 202 includes a first end 204 having an internally threaded bore 206 that may be any suitable length (e.g., to prevent the threads from stripping due to tightening). A rod end bearing or spherically shaped bearing 208 includes a bearing retainer or body 210 having a shaft or shank 212 extending therefrom. The shaft 212 includes an internally threaded bore 214 that may be any suitable length. An externally threaded stud 216 threadably engages the bores 206 and 214 to couple the actuator stem 202 and the rod end bearing 208. As a result of eliminating the need to machine external threads, the rod end bearing and actuator stem connection 200 provides greater strength than the rod end bearing and actuator stem connection 156 described in FIG. 1. Furthermore, the stud 216 is made of high strength alloy steel and, thus, is substantially stronger than the external threads 150 of the rod end bearing 144 of FIG. 1 (or, alternatively, an externally threaded portion of an actuator stem).

Additionally or alternatively, at least a portion of the bore 206 may include a tapered recess 218 and at least a portion of the shaft 212 may include a tapered end or edge 220. When coupled together, the tapered edge 220 engages the tapered recess 218 to provide a self-locking connection between the actuator stem 202 and the rod end bearing 208. As a result, the rod end bearing and actuator stem connection 200 further resists the angular deflection of the actuator stem 202 and the torsional load that may be caused by tightening or loosening a fastener (e.g., the fastener 126 of FIG. 1) when assembling and/or disassembling a control valve such as, for example, a control valve 300 such as that shown and described below in connection with FIG. 3. In the illustrated example, the tapered edge 220 of the shaft 212 may be angled substantially similar or complimentary to the angle of the tapered recess 218 so that the tapered edge 220 matably engages the tapered recess 218 of the actuator stem 202. However, in other examples, the tapered edge 220 may have an angle different from that of the tapered recess 218.

Figure 3:
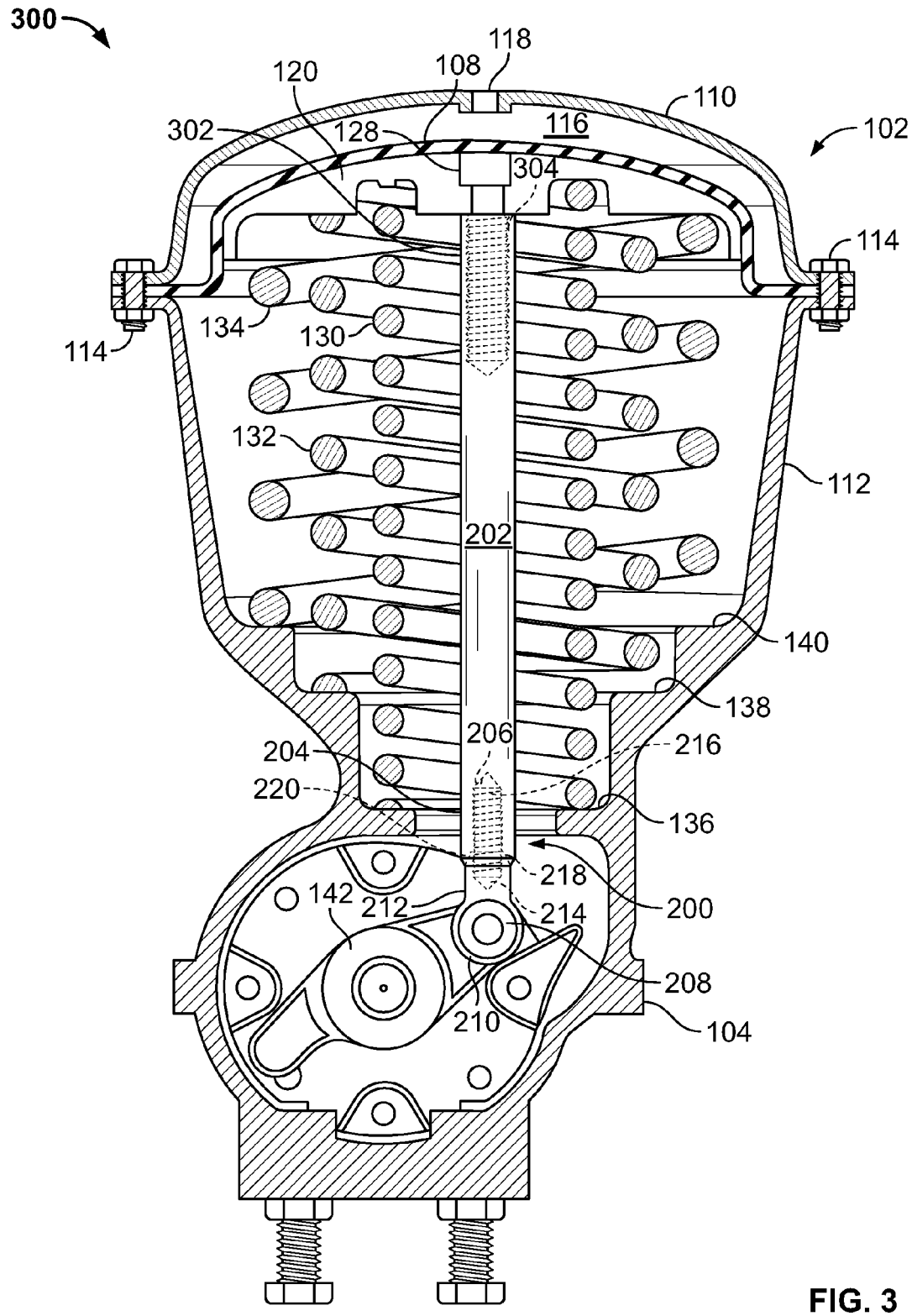
FIG. 3 illustrates the example rotary control valve implemented with the example rod end bearing and actuator stem connection illustrated in FIG. 2.

FIG. 3 illustrates an example control valve 300 implemented with the example rod end bearing 208 and the actuator stem 202 of FIG. 2. The description of those components of the control valve 300 similar or identical to those described in connection with the control valve 100 of FIG. 1 is not repeated and the interested reader may refer to the description in connection with FIG. 1 for details relating to those components.

Referring to FIG. 3, the rod end bearing 208 is operatively coupled to the actuator stem 202 via the externally threaded stud 216. The actuator stem 202 includes a second end 302 having an internally threaded bore 304 that receives the fastener 128. The fastener 128 couples the diaphragm plate 120 and the diaphragm 108 to the actuator stem 202. As the diaphragm plate 120 is fastened to the actuator stem 202, the springs 130, 132, and 134 compress and provide a preload condition. Additionally, during assembly of the control valve 300, the torque applied to the fastener 128 to couple the diaphragm plate 120 to the actuator stem 202 transmits a torsional load to the actuator stem 202, causing the actuator stem 202 to angularly deflect.

The rod end bearing and actuator stem connection 200 provides a stronger connection between the rod end bearing 208 and the actuator stem 202 to resist the torsional load transmitted by the fastener 128 during assembly and/or disassembly of the control valve 300. Furthermore, the tapered edge 220 of the shaft 212 engages the tapered recess 218 of the actuator stem 202 to provide a locking condition between rod end bearing 208 and the actuator stem 202, thereby further resisting the torsional load and angular deflection applied to the actuator stem 202 when turning the fastener 128. In this manner, the stronger connection 200 substantially reduces twist off or fracture of the rod end bearing and actuator stem connection 200 that may occur as a result of over torquing or tightening due to operator error.

The example rod end bearing 208 and actuator stem 202 may be factory installed and/or may be retrofit to existing valves. For example, to retrofit an existing valve such as, for example, the control valve 100 of FIG. 1, the rod end bearing 144 and the actuator stem 122 are removed and replaced with the example actuator stem 202 and rod end bearing 208. The externally threaded stud 216 may be obtained or provided to couple the actuator stem 202 and rod end bearing 208. The externally threaded stud 216 is made of high strength, alloy steel and may be made via machining or any other suitable process(es). The actuator stem 202 and the rod end bearing 208 having internally threaded bores 206 and 218, respectively, are obtained or provided via, for example, machining or any other suitable process(es). Additionally or alternatively, the tapered edge 220 and/or the tapered recess 218 may be formed via machining and/or any other suitable process (es).

Although certain methods and apparatus have been described herein, the scope of coverage of this patent is not limited thereto. To the contrary, this patent covers all apparatus fairly falling within the scope of the appended claims either literally or under the doctrine of equivalents.

What is claimed is:

1. A control valve, comprising:
    an actuator disposed within a housing having a diaphragm captured between a first actuator casing and a second actuator casing;
    an actuator stem having a first end and a second end that each include an internally threaded bore, wherein the first end of the actuator stem operatively couples to the diaphragm and the second end includes a tapered recess;
    a rod end bearing having a bearing retainer and a shaft portion extending from the bearing retainer, wherein the shaft portion includes an internally threaded bore and a protruding tapered end to engage the tapered recess of the actuator stem to provide a self-locking connection between the actuator stem and the rod end bearing; and
    an externally threaded stud to threadably engage the bore of the shaft portion and the bore of the second end of the actuator stem to couple the rod end bearing and the actuator stem.

2. A control valve as defined in claim 1, wherein the diaphragm is coupled to the first end of the actuator stem via a diaphragm plate.

3. A control valve as defined in claim 2, wherein the diaphragm plate couples to the actuator stem via a fastener.

4. A control valve as defined in claim 1, further comprising a biasing element disposed within the housing and captured between the housing and a diaphragm plate.

5. A control valve as defined in claim 1, wherein the control valve comprises a rotary control valve.

6. A control valve as defined in claim 5, wherein the rod end bearing rotatably couples the actuator stem to a lever arm.

7. A control valve as defined in claim 1, wherein the stud comprises an alloy steel.

8. A control valve of claim 1, wherein the self-locking connection prevents rotation of the actuator stem relative to the rod end bearing.

9. An assembly of claim 1, wherein the protruding tapered end has an angle that is complementary to an angle of the tapered recess.

10. An assembly of claim 9, wherein the protruding tapered end of the rod end bearing and the tapered recess of the actuator stem matably engage when the rod end bearing is coupled to the actuator stem.

11. An assembly for use with a control valve comprising:
    a bearing having a body and a portion extending from the body, wherein the portion includes an internally threaded bore and a protruding edge having a profile different than a profile of the body;
    an actuator stem having a first end that includes an internally threaded bore and a recess to receive the protruding edge of the bearing; and
    an externally threaded stud that threadably engages the bores of the rod end bearing and the actuator stem to couple the rod end bearing and the actuator stem.

12. The assembly as defined in claim 11, wherein the protruding edge of the bearing includes a tapered surface to matably engage a tapered surface of the recess to provide a locked condition between the bearing and the actuator stem when the rod end bearing is coupled to the actuator stem via the externally threaded stud.

13. The assembly as defined in claim 11, wherein the stud comprises an alloy steel.

14. An assembly of claim 11, wherein the protruding edge engages the recess when the actuator stem is coupled to the bearing via the externally threaded stud.

15. An assembly of claim 14, wherein the profile of the protruding edge is complementary to a profile of the recess.

16. An assembly of claim 15, wherein the recess is tapered relative to the bore and the protruding edge is tapered relative to the body of the bearing.

17. An assembly of claim 16, wherein an angle of the protruding edge is complementary to an angle of the recess so that the protruding edge matably engages the recess.

18. A method to couple a rod end bearing and an actuator stem, the method comprising;
    obtaining a rod end bearing having a portion with an internally threaded bore and a protruding tapered edge and an actuator stem having an internally threaded bore and a tapered recess at a first end to receive the protruding tapered edge; and
    coupling the rod end bearing to the actuator stem via an externally threaded stud such that the protruding tapered edge engages the tapered recess to provide a locking condition between the actuator stem and the rod end bearing when the rod end bearing is coupled to the actuator stem via the stud.

19. A method as described in claim 18, further comprising providing the tapered edge or the tapered recess via machining.

* * * * *

UNITED STATES PATENT AND TRADEMARK OFFICE
CERTIFICATE OF CORRECTION

| | | |
|---|---|---|
| PATENT NO. | : 8,061,681 B2 | Page 1 of 1 |
| APPLICATION NO. | : 12/115280 | |
| DATED | : Nov. 22, 2011 | |
| INVENTOR(S) | : Paul Russell Dalluge | |

It is certified that error appears in the above-identified patent and that said Letters Patent is hereby corrected as shown below:

Column 6, line 22 (claim 11), after "the" delete "rod end"

Column 6, line 23 (claim 11), after "the" delete "rod end"

Column 6, line 28 (claim 12), after "the" delete "rod end"

Signed and Sealed this
Fourteenth Day of February, 2012

David J. Kappos
*Director of the United States Patent and Trademark Office*